United States Patent [19]

Remington

[11] 4,308,731
[45] Jan. 5, 1982

[54] COMBINATION LOCKS

[75] Inventor: Richard C. Remington, Pompton Plains, N.J.

[73] Assignee: Presto Lock Company, Division of Walter Kidde & Company, Inc., Garfield, N.J.

[21] Appl. No.: 33,540

[22] Filed: Apr. 26, 1979

[51] Int. Cl.³ ............... E05B 15/14; E05B 37/02; E05B 65/48
[52] U.S. Cl. .................................. 70/74; 70/312; 70/323
[58] Field of Search ............... 70/312, 321, 318, 316, 70/315, 69–76, 317, 320, 323

[56] References Cited

U.S. PATENT DOCUMENTS

| 1,288,053 | 12/1918 | Lampson | 70/312 |
| 1,964,936 | 7/1934 | Denerick | 70/312 |
| 2,114,073 | 4/1938 | Denerick | 70/312 |
| 3,633,388 | 1/1972 | Atkinson | 70/312 |
| 3,983,727 | 10/1976 | Todd | 70/323 |
| 4,123,923 | 11/1978 | Bako | 70/316 |

Primary Examiner—Robert L. Wolfe
Attorney, Agent, or Firm—Shapiro and Shapiro

[57] ABSTRACT

Combination locks employ dial-driven rotary elements that must be turned to a predetermined position to open the lock. Each rotary element has a periphery that is circular except for a notch that mates with a ridge portion on cooperable means when the corresponding dial is "on-combination." The cooperable means may comprise a bolt that pivots or slides, for example.

23 Claims, 19 Drawing Figures

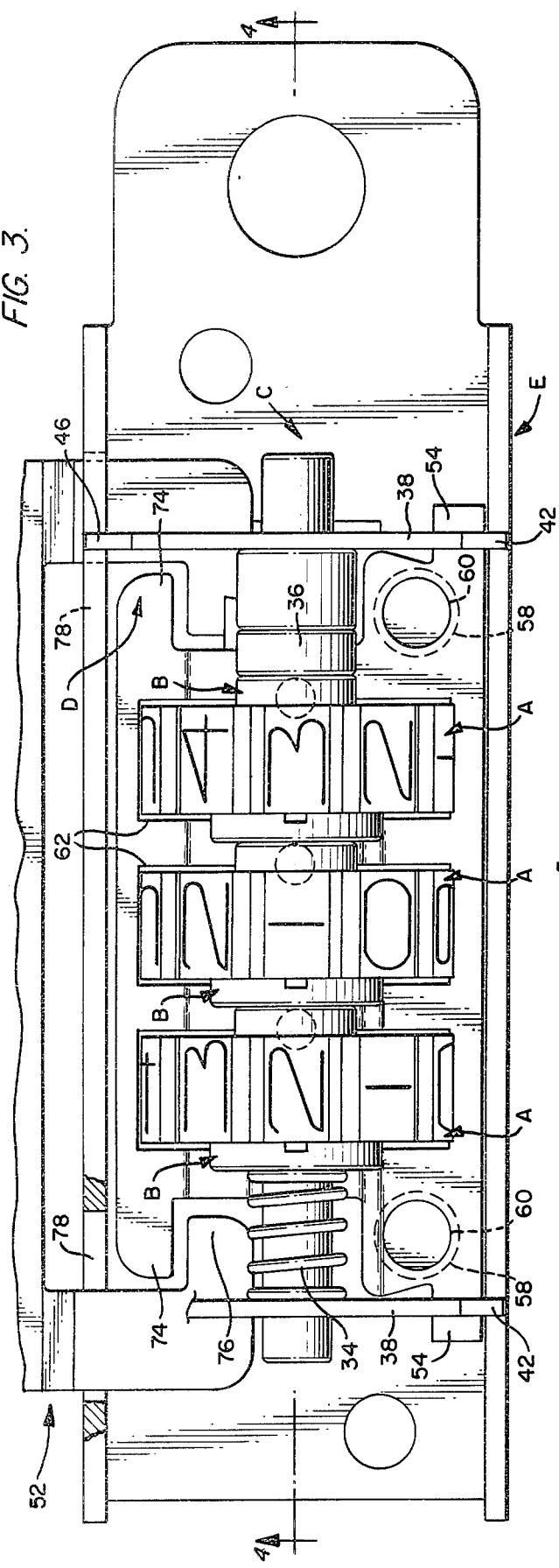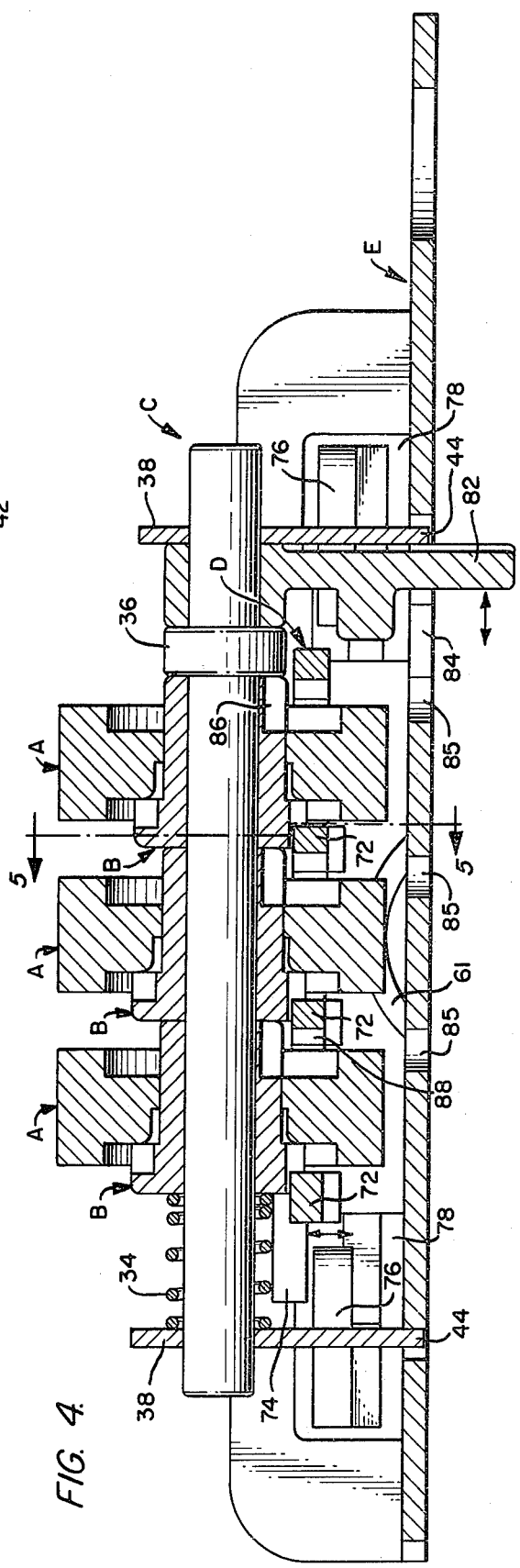

COMBINATION LOCKS

BACKGROUND OF THE INVENTION

This invention relates generally to combination locks, and more particularly to combination locks of the type employing dial-driven rotary elements, such as sleeves, that must be turned to a predetermined position to open the lock.

Because of their small size and relatively simple construction, combination locks of the type to which the invention pertains are particularly well adapted for use as locking mechanisms on luggage and the like. One type of prior combination lock, disclosed in U.S. Pat. No. 3,800,571 to Heine, issued Apr. 2, 1974, and assigned to the same assignee as the present invention, employs a flat, spring-biased bolt pivoted along one edge and moved to a locked position by sleeves that are rotated about a common axis by combination dials. Each sleeve has a bolt-engaging cam comprising a circular flange with a flat portion. When the dials are placed "on-combination," each cam is in its "unlocked" position, with all the flat portions of the cams aligned to permit the flat bolt to move to an "unlocked" position, so that the lock may be opened. Turning any dial "off-combination" causes the corresponding cam to turn from its unlocked position to a "locked" position at which the circular flange engages the bolt and moves it to a "locked" position, so that the lock may not be opened.

A typical lock of the type disclosed in the Heine patent employs dials with ten discrete combination number positions. To move a dial from one number position to the next requires 36° of dial rotation. Thus, turning a dial from its on-combination position to a succeeding number position in either direction of rotation turns the corresponding cam 36° in either direction from its unlocked position. If the flat portion of the cam subtended 72° (twice 36°), the 36° cam movement just described would cause a point on the circular flange of the cam to contact the bolt tangentially and would produce the same bolt travel regardless of the direction of rotation of the dial from its on-combination position. Unfortunately, if such cams were employed in the typical lock, the amount of bolt travel would be insufficient to ensure reliable cooperation of the bolt with a hasp. In order to achieve additional bolt travel, it has been the practice to employ cams with flat portions that subtend more than 72°. However, this construction has certain disadvantages. First, when a dial is turned in opposite directions from its on-combination position, the bolt travel is not the same. The difference in bolt travel can result in insecure locking. Second, when a dial is one number position away from its on-combination position, the contact of the corresponding cam with the bolt is not tangential. Thus, pressure on the bolt may exert a torque on the cam that moves the cam to its unlocked position. This may occur when the lock is subjected to shock forces, for example.

Sleeves of the type just described are also used in combination locks having a sliding mechanism, rather than a pivoted bolt. For example, U.S. Pat. No. 3,416,338 to Gehrie, issued Dec. 17, 1968, and assigned to the same assignee as the present invention, discloses a combination lock employing a bolt that slides in a direction parallel to the rotational axis of the sleeves. U.S. Pat. No. 3,405,544 to Gehrie, issued Oct. 15, 1968, and assigned to the same assignee as the present invention, discloses a combination lock in which the sleeves slide relative to fixed abutments. U.S. Pat. No. 3,543,545 to Budzyn, issued Dec. 1, 1970, and assigned to the same assignee as the present invention, discloses a combination lock in which a bolt slides in a direction perpendicular to the rotational axis of the sleeves. Such locks also may have problems due to the construction of the sleeves and cooperable parts. For example, as will be discussed in detail later, pressure at the interface of a sleeve and a cooperable part may exert a torque that turns the sleeve to its unlocked position.

It is desirable, therefore, to provide combination locks which overcome the aforesaid difficulties, and it is to this end that the present invention is directed.

SUMMARY OF THE INVENTION

A primary object of the invention is to provide new and improved combination locks.

A further object of the invention is to provide a combination lock of the pivoting bolt type in which the bolt stroke is the same when a dial is turned either clockwise or counterclockwise from its on-combination position.

Another object of the invention is to provide a combination lock which will not open inadvertently when subjected to shock forces.

Yet another object of the invention is to provide a combination lock in which the force required to rotate the dials in opposite directions in the vicinity of their on-combination position is more uniform.

Briefly stated, in one aspect a combination lock in accordance with the invention may have a plurality of dials, each coupled to a corresponding rotary element having a periphery that is circular except for a peripheral portion that must be turned to a predetermined position relative to cooperable means to permit the lock to be opened. Each peripheral portion has a notch and the cooperable means has a ridge portion for each notch, with the ridge portions mating with the notches, respectively, when the notches have the predetermined position. In another aspect, a combination lock in accordance with the invention may have a bolt moved by dial-driven cams between an unlocked position and a locked position. Each cam has a notch into which a corresponding ridge portion of the bolt fits when the bolt is in the unlocked position.

These and other objects, advantages, features, and improved results provided by the invention will become apparent from the following detailed description and drawings of preferred embodiments of the invention.

BRIEF DESCRIPTION OF THE DRAWINGS

FIG. 3 is a top plan view, partially broken away, illustrating a pivoting bolt combination lock made in accordance with the invention, the lock being illustrated in association with a hasp partially shown;

FIG. 4 is a vertical sectional view taken along line 4—4 of FIG. 3;

DETAILED DESCRIPTION OF THE PREFERRED EMBODIMENTS

Figure 1A:
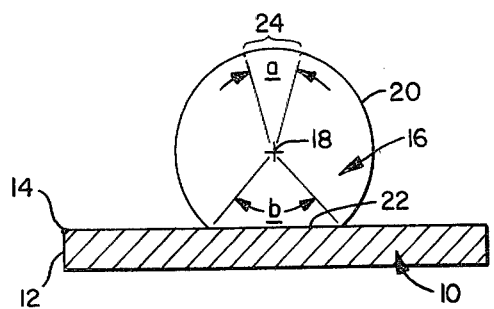
FIGS. 1A–1C are diagrammatic views illustrating the cam-bolt arrangement employed in a conventional combination lock of the pivoting bolt type.
Figure 1B:
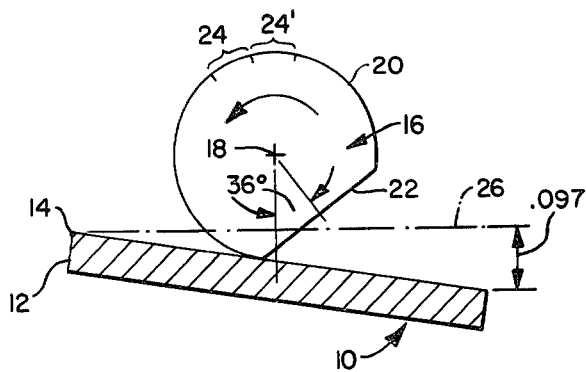
Figure 1C:
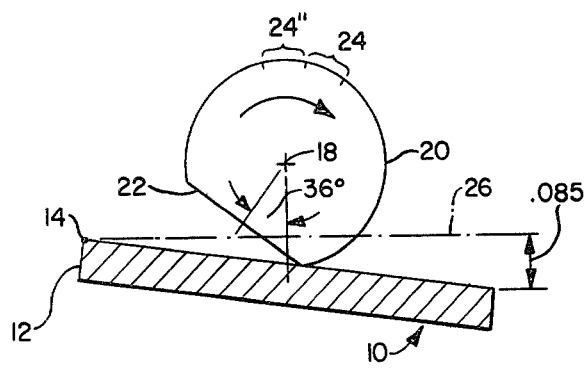

A first preferred embodiment of the invention is an improvement upon a prior combination lock of the type employing a pivoting bolt cooperable with cams that are turned by corresponding combination dials. Such a lock is disclosed in the Heine patent referred to earlier and incorporated herein by reference. The prior art bolt-cam arrangement is illustrated in FIGS. 1A–1C. Bolt 10 constituting a locking member is, in essence, a flat plate supported for pivotal movement at an edge 12 about an axis 14 (perpendicular to the plane of the drawing). Only one cam 16 is shown, but in the actual lock there may be three cams, for example, each driven by a corresponding dial (not shown in FIGS. 1A–1C). Each dial and its cam rotates about an axis 18 (perpendicular to the plane of the drawing). Each cam has a circular periphery 20 centered on axis 18 and has a chordal flat portion 22 that truncates the circular periphery.

FIG. 1A illustrates the "unlocked" position of the cam and the bolt, where the flat portion 22 is juxtaposed with a mating flat surface of the bolt. It is assumed in FIG. 1A that all of the cams are in their unlocked position and that the bolt is held against the flat portions of the cams by a spring (not shown here).

Each dial has ten combination indicia (numbers) equally spaced about its periphery. The peripheral position of the number displayed when a cam is in its unlocked position is designated in FIG. 1A by reference numeral 24 (although the number is actually on the dial, not the cam). Each number position subtends 36° (angle a in FIG. 1A), but the flat portion 22 subtends more than 72° (angle b is greater than 72°), with effects which will now be described.

When cam 16 is turned counterclockwise, as shown in FIG. 1B, one number position away from its unlocked position, so that the number at succeeding position 24' is now displayed, the stroke of the free end of bolt 10 relative to reference line 26 (representing the unlocked position of the bolt in FIG. 1A) is, for example, 0.097 inch. When, on the other hand, the cam is turned clockwise, as shown in FIG. 1C, one number position away from its unlocked position, so that the number at succeeding position 24" is displayed, the stroke of the free end of the bolt is only 0.085 inch.

Although the theoretical difference in stroke is about 0.012 inch, in practice the difference can exceed 0.020 inch due to backlash, dial positioning error and tolerance build-up. The reduced bolt stroke with clockwise cam rotation results in limited engagement of the bolt with a hasp (to be described) and causes insecure locking. Furthermore, when the cam is in the positions illustrated in FIGS. 1B and 1C, the contact of the cam with the bolt is not tangential (the contact being at a "corner" of the flat portion) and pressure on the bolt toward the cam may produce a torque that will turn the cam to the unlocked position of FIG. 1A. Thus, undesirable opening of the lock may occur in response to shock forces (dropping of a luggage case, for example). Also, the force required to turn a dial when its cam is near its unlocked position will vary considerably depending upon the direction of rotation, because the opposite corners of the flat portion of the cam contact the flat surface of the bolt at widely different distances from axis 14.

It is apparent from FIGS. 1A–1C that the unequal stroke of the bolt is the result of angle b being greater than twice angle a, that is, angle b is greater than 72°. With the same circular periphery, if the length of flat portion 22 were reduced (by using a shorter chord of the circle centered on axis 18) the flat portion could be made to subtend 72°, and the unequal bolt stroke could be eliminated. The contact of the bolt with the cam would then be tangential regardless of the direction of rotation of the cam from its unlocked position to a succeeding number position, and pressures exerted on the bolt would be directed at the center of rotation of the cam, producing no torque on the cam. Unfortunately, the problem of insecure engagement of the bolt with a hasp would not be solved by this technique, because the maximum theoretical bolt stroke would be reduced to 0.060 inch in the illustrative structure, and this stroke would not be sufficient to ensure reliable engagement with a hasp.

The present invention solves this problem by providing a structure in which the bolt travel is the same regardless of the direction in which a cam is turned from its unlocked position, in which the bolt stroke is adequate to ensure secure engagement with a hasp (being substantially the same as the maximum theoretical stroke in the prior art), and in which the contact between the bolt and a cam is tangential when the cam is one number position away from the unlocked position of the cam.

Figure 2A:
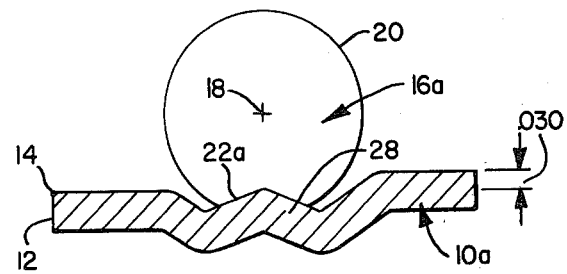
FIGS. 2A–2C are similar diagrammatic views illustrating an improved cam-bolt arrangement provided by the present invention.
Figure 2B:
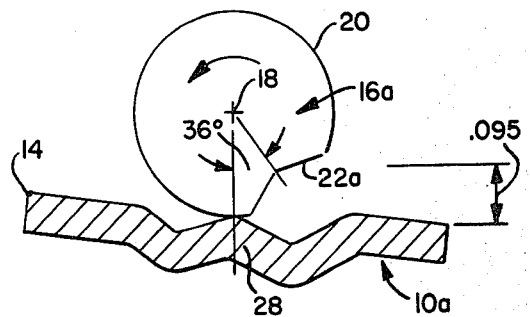
Figure 2C:
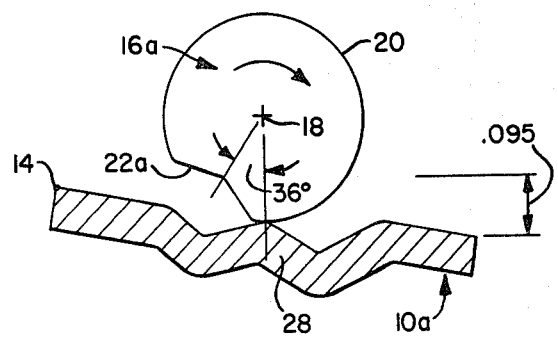

The remarkably improved structure of the invention is illustrated diagrammatically in FIGS. 2A–2C. As shown, a modified cam 16a still has a circular periphery 20, but instead of the flat portion 22 a V-notch portion 22a is employed (with an included angle preferably about 140°). Bolt 10a constituting a locking member, instead of being flat, has a central ridge portion 28 that mates with the V-notch 22a. The left end of bolt 10a in FIGS. 2A–2C may have a configuration similar to the left end of bolt 10 in FIGS. 1A–1C, and the ridge portion 28 may be formed by shaping the central portion of bolt 10a into a configuration resembling a flat letter W. The right side of bolt 10a may be similar to the right side of bolt 10, but it is preferred to offset the right side upwardly (assuming orientation of the parts as in FIG. 2A). The purpose of the offset is to provide the desired unlocked and locked positions of the free end of the bolt, for release and retention of a hasp. As will be seen hereinafter, the bolt and cam arrangement of the invention may be employed with other components that are presently employed in standard combination locks.

The cam and bolt positions illustrated in FIG. 2A are the unlocked positions of these parts. Again, it is assumed that other cams employed in the lock have the position illustrated in FIG. 2A and that the bolt is urged against the cams by a spring. As shown, ridge portion 28 has a shape that complements that of notch 22a.

With the above arrangement, it is apparent that the ridge formation 28 in each case is defined by substantially planar converging camming surfaces which, in the unlocked condition of the bolt, as evident from FIG. 2A, are disposed symmetrically with respect to a line passing through the center of the cam and the junction of planes defining the converging surfaces. When the cam is turned in one or the other direction from the FIG. 2A position, one or the other of the points on the cam that define the junctions of the notch 22a and the circular cam periphery 20 provides a cam formation which will move along the respective ridge surface of the bolt which provides a cooperative cam formation. Thus, downward camming of the bolt is effected toward the FIG. 2B or FIG. 2C position.

When cam 16a is turned 36° counterclockwise (one number position) from the unlocked position of FIG. 2A, as shown in FIG. 2B, the crest of ridge portion 28 will rest on the circular periphery 20 of the cam, and when the cam is turned clockwise from the position of FIG. 2A by the same amount, as shown in FIG. 2C, the crest of ridge portion 28 will again rest on the circular periphery 20 of the cam. The notch subtends slightly less than 72° on the cam to ensure the conditions just described.

With the cam and bolt configuration of the invention, the bolt stroke achieved in FIG. 2B is the same as that achieved in FIG. 2C, for example 0.095 inch in the illustrative construction. This is substantially the same as the 0.097 inch maximum stroke achieved in FIG. 1B, which is sufficient to ensure secure hasp engagement. The total stroke of the bolt is caused partially by the shape of the cam and partially by the shape of the bolt. Since the bolt contacts the circular periphery of the cam tangentially in both FIGS. 2B and 2C, any forces exerted upon the cam by the bolt are directed at axis 18 and cannot produce a torque to turn the cam to its unlocked position. Moreover, the force required to turn a dial in opposite directions in the vicinity of its on-combination position is more uniform than in the structure of FIGS. 1A-1C, producing better "feel."

It is now appropriate to describe an actual combination lock employing the bolt and cam arrangement of the invention as just described in connection with FIGS. 2A-2C. As shown in FIGS. 3-9, principal parts of the lock include combination dials A, sleeves B, a shaft C, a bolt D and a frame E.

Each dial A is supported on shaft C by a corresponding sleeve B. The dials have internal gear teeth 30 that mesh with external gear teeth 32 of the sleeves. The sleeves are held in successive abutting relationship by a coil compression spring 34 on the shaft, which urges the sleeves toward a collar 36 integral with the shaft. Opposite ends of the shaft may be supported upon brackets 38, one of which is shown in detail in FIG. 9. Each bracket has a hole 40 into which the corresponding end of shaft C is inserted. Spring 34 is compressed between one of the brackets and an adjacent sleeve as shown in FIG. 4.

Figure 5:
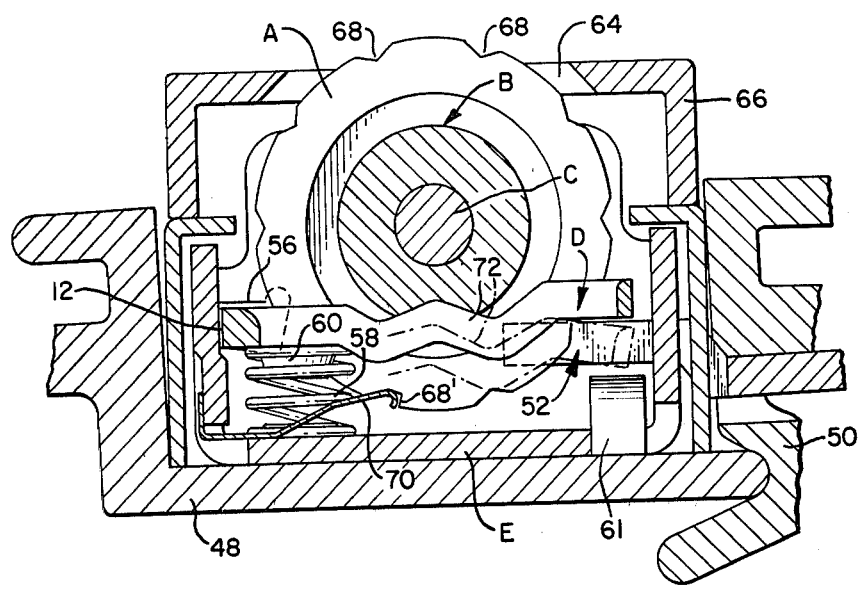
FIG. 5 is a vertical sectional view taken along line 5—5 of FIG. 4, this view also illustrating a cover for the lock and valance members adapted to be mounted on luggage or the like to which the lock may be attached.

Frame E may be generally U-shaped in cross-section, as shown in FIG. 5, and each bracket 38 may have protrusions 42, 44, and 46 that enter corresponding slots in the adjacent walls of the frame. The frame may be supported on a valance member 48 (FIG. 5) applied to an edge of part of a luggage case, for example, in a conventional manner. A mating valance member 50, applied to an edge of another part of the luggage case, may support a hasp 52 in a conventional manner, as indicated in FIGS. 3 and 5. The parts of the luggage case may be hingedly connected, and may be held closed, one upon the other, by engagement of hasp 52 with bolt D.

The bolt is supported along edge 12 for pivotal movement relative to the frame and the assembly of dials and sleeves. In the form shown, this is accomplished by providing lugs 54 at opposite ends of the bolt that are received in slots 56 of brackets 38. The slots are shaped to accommodate the pivotal movement of the bolt. Coil compression springs 58 adjacent to opposite ends of the bolt near edge 12 are positioned between the bolt and the frame to bias the bolt toward the sleeves. The bolt may have locating bosses 60 for the springs. A stop 61 limits movement of the bolt away from the sleeves.

Figure 6:
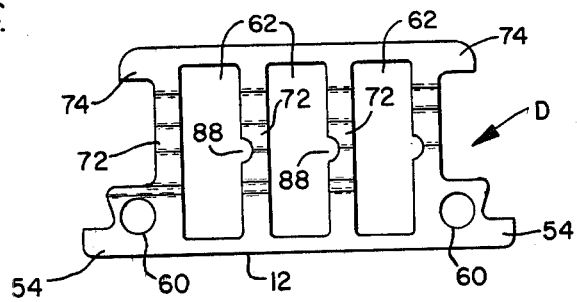
FIG. 6 is a top plan view of a pivoting bolt in accordance with the invention.
Figure 7:
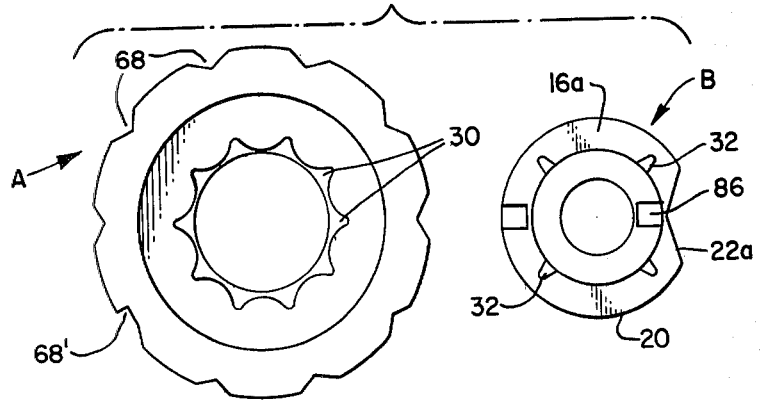
FIG. 7 is an end view of a dial and associated flanged sleeve which may be employed in the invention.
Figure 8:
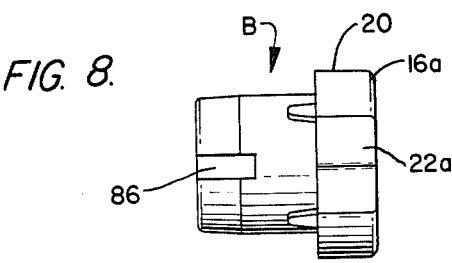
FIG. 8 is a side elevation view of the sleeve of FIG. 7.
Figure 9:
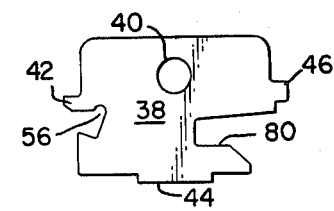
FIG. 9 is a plan view of a bracket that may be employed for supporting parts of the lock mechanism on a frame.
Figure 10:
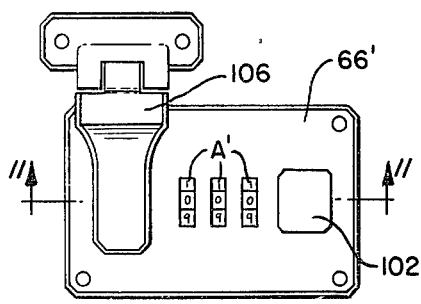
FIG. 10 is a plan view illustrating the external appearance of another embodiment of a combination lock in accordance with the invention.

As shown in FIGS. 3, 4 and 6, the bolt has a series of openings 62 freely receiving the dials A so that the bolt may engage sleeves B without interference from the dials. The dials may also protrude through corresponding openings 62 in a cover plate 66 (see FIG. 5), where the combination indicia of the dials are displayed to the user. Each dial may have ten combination numbers equally spaced about its circumference, with successive numbers separated by indexing notches 68. The indexing notches cooperate with arms of a dial spring 70 as shown in FIG. 5. In the form shown the dial spring has its base supported in a slot of the frame and has a resilient arm for each dial that enters the indexing notches of that dial. As shown, the indexing notches may be symmetrical V-shaped notches, but one notch, 68', may have a radial surface that engages the associated arm of the dial spring to stop rotation of the dial when the dial is rotated in a given direction (clockwise in FIG. 5) to a particular rotational position. This feature permits rapid setting of all the dials to a zero position, for example.

Each of the sleeves B has a flange forming the cam 16a described in connection with FIGS. 2A-2C. The flange has a circular periphery 20 with a V-notch 22a. As shown in FIGS. 5 and 6, bolt D has a ridge 72 with portions that mate with corresponding notches 22a when the sleeves are turned to the rotational position of FIG. 5. The bolt has latching lugs 74 adapted to engage corresponding lugs 76 (see FIG. 3) of the hasp, but when the bolt is in the unlocked position of FIG. 5, there is no engagement with the hasp. Lugs 76 of the hasp enter the frame E via slots 78 and are received in slots 80 of brackets 38 (see FIG. 9) tapered to guide lugs 76 to a predetermined position when the parts of the luggage case are closed.

When the bolt is in the full-line position of FIG. 5, all of the dials are on-combination and the lock may be opened. If any dial is turned off-combination, the corresponding cam 16a will move the bolt to the phantom line (locked) position shown in FIG. 5, positioning latching lugs 74 of the bolt for engagement with the corresponding lugs 76 of the hasp and preventing withdrawal of the hasp from the frame E.

The action of the cam and bolt assembly just described is precisely the same as described with reference to FIGS. 2A-2C, with all of the attendant advantages.

Prior combination locks employing pivoting bolts in association with rotating sleeves having cams with flat portions (as in FIGS. 1A-1C) may employ a mechanism permitting the user to change the combination when the dials are on-combination. Such a mechanism has also been included in the foregoing embodiment of the invention and comprises a lever 82 (see FIG. 4) mounted on shaft C and protruding through a slot 84 in the frame. By moving lever 82 to the left in FIG. 4 against the bias of spring 34, the sleeves B may be moved to the left relative to the corresponding combination dials A to disengage the gear teeth 32 of the sleeves from the gear teeth 30 of the dials. If lever 82 is held in its leftward position (it may be so held by turning it slightly and engaging it with a branch of slot 84), the combination dials may be turned independently of the sleeves and set to a new combination. When lever 82 is returned to the position illustrated in FIG. 4 (under the bias of spring 34) the sleeves will be reengaged with the dials and the lock will operate in its normal manner, but with a new combination.

Prior combination locks also may employ a combination "finding" feature that permits the combination to be determined when the lock has been opened and the dials scrambled. For this purpose the frame has holes 85 for receiving a probe, and the sleeves have recesses 86 into which the probe may be inserted when the sleeves are turned to their unlocked position. Bolt D has recesses 88 (see FIG. 6) for passing the probe.

As stated earlier, when sleeves having circular peripheries with flat portions are employed in conjunction with cooperable parts that slide relative to the sleeves (see, for example, U.S. Pat. No. 3,416,338 to Gehrie referred to earlier and incorporated herein by reference), the combination lock may suffer from certain problems that afflict combination locks having pivoting bolts. Fortunately, the bolt and sleeve configurations of the invention are highly efficacious in both types of locks.

Figure 14:
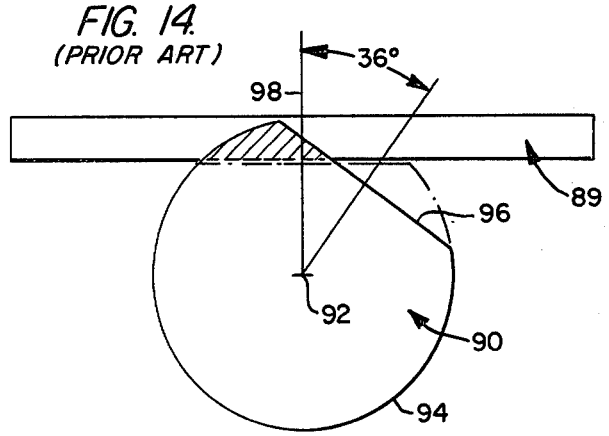
FIGS. 14 and 15 are diagrammatic views illustrating, respectively, a prior art bolt-sleeve arrangement and a bolt-sleeve arrangement in accordance with the invention.

A problem which may be encountered in a prior combination lock employing a sliding bolt is illustrated in FIG. 14, where the sliding bolt 89 and a typical sleeve 90 are shown diagrammatically. To open the lock (as will be described shortly) bolt 89 must slide toward the viewer (perpendicular to the plane of the drawing) in a direction parallel to the axis of rotation 92 of the sleeves, only one of which is shown in FIG. 14. Each sleeve has a circular periphery 94 with a flat portion 96. In the unlocked position of the sleeves, each sleeve assumes the phantom line position shown in FIG. 14 so that the bolt may bypass the flat portions 96. When a sleeve is turned one number position away from its unlocked position (36° in the illustrative embodiment) the shaded portion of the sleeve will provide an interface with the bolt and will block movement of the bolt required to open the lock. It is apparent in FIG. 14 that the shaded portion is highly asymmetrical relative to line 98 (representing an axial plane of sleeves 90 that is perpendicular to the bolt 89). If pressure is exerted on the bolt tending to move the bolt toward the viewer, a force may be exerted on the sleeve at the larger portion of the shaded area which may have a component tending to turn the sleeve about its rotational axis, particularly if a chamfer or worn area exists at the interface of the sleeve and the bolt. Thus a sleeve may be turned to its unlocked position undesirably, for example when a luggage case bearing the lock is dropped.

Figure 15:
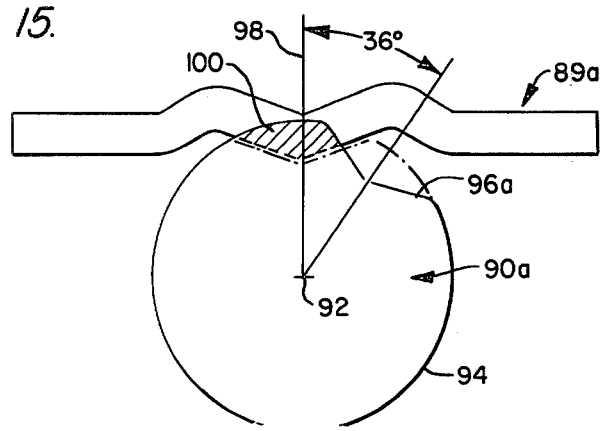

As shown in FIG. 15, if sleeves 90a are employed, with V-notches 96a, rather than flat portions 96, and if the bolt 89a has ridge portions 100 that mate with the notches, the shaded area of contact between the bolt and the sleeves is much more symmetrical about line 98, that is, the sub-areas at opposite sides of line 98 are substantially equalized, so that a force exerted by the bolt at one sub-area is counterbalanced by a force exerted at the opposite sub-area, preventing the application of a torque to the sleeves that is substantial enough to turn a sleeve to its unlocked position. In FIG. 15 line 98 extends from rotational axis 92 to the peak of ridge portion 100.

To further illustrate the invention, an embodiment employing a sliding bolt in a combination lock based upon the lock of U.S. Pat. No. 3,416,338 will now be described in detail.

As shown in FIGS. 10-13, principal parts of the combination lock may include combination dials A', sleeves B', shaft C', bolt D', and frame E'. The dials may protrude through slots in a cover plate 66', and a manual actuator 102 (sometimes called a "puller") extends through an opening in the cover plate and is attached to one end of the bolt D'. The other end of the bolt has a latch member 104 that cooperates with a conventional spring-biased hasp 106.

The dials and the sleeves may have a construction similar to that described earlier and may be assembled on shaft C' in a similar manner, with the sleeves being urged into successive abutting relationship by a spring 34', and with the dials cooperating with a dial spring 70'. The assembly of the dials, the sleeves, and the shaft may be supported on brackets 108 and 109. A lever 82' may be employed to disengage the sleeves from the dials to permit the combination to be changed, and the lock may have a combination "finding" feature as earlier described.

Figure 11:
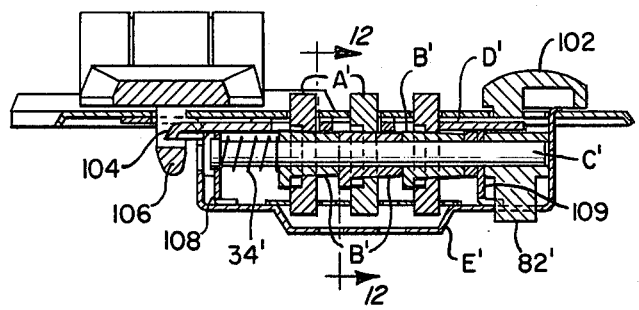
FIG. 11 is a vertical sectional view taken along line 11—11 of FIG. 10.
Figure 12:
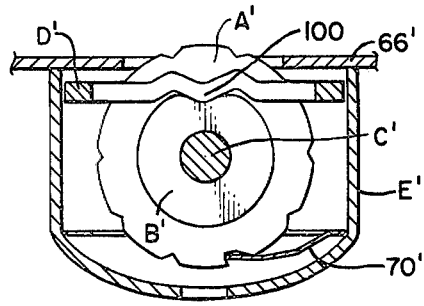
FIG. 12 is a vertical sectional view taken along line 12—12 of FIG. 11.
Figure 13:
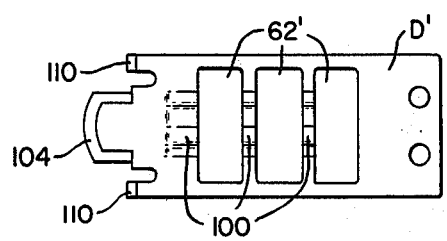
FIG. 13 is a bottom plan view of a sliding bolt in accordance with the invention.

As shown in FIGS. 11-13, the bolt has a series of openings 62' through which the dials extend, but these openings must be wide enough to permit movement of the bolt relative to the dials in a direction parallel to the axis of shaft C'. As is apparent in FIG. 12, the bolt has a configuration similar to that shown in FIG. 15. When the sleeves are turned to mate the notches 96a (FIG. 15) with the ridge portions 100, manual actuator 102 may be moved to the right in FIG. 11, with the ridge portions of the bolt bypassing the V-notch portions of the sleeves. Latch member 104 of the bolt may thus be disengaged from the hasp. When the bolt is moved to the right in FIG. 11, lugs 110 (FIG. 13) of the bolt engage bracket 108 and move the bracket to the right in FIG. 11, compressing spring 34'. This spring returns the bolt to the left in FIG. 11 when manual actuator 102 is released. Bracket 109 is moved to the left by lever 82', also compressing spring 34', when the combination is to be changed.

If any dial is off-combination, the corresponding sleeve will be turned so that the circular periphery 94 of the flange of the sleeve enters one of the openings 62', preventing movement of the bolt required to open the lock. As demonstrated in FIG. 15, when a sleeve is one number position away from its unlocked position, the configuration of the sleeve-bolt interface will be much more evenly distributed about line 98 than the prior art (FIG. 14) and the bolt will be unable to exert a substantial torque on the sleeve.

Although the foregoing embodiment has been described with reference to a combination lock employing a bolt that slides in a direction parallel to the axis or rotation of the sleeves, it will be apparent to those skilled in the art that certain advantages of the invention may be achieved where the bolt slides in a direction perpendicular to the axis of rotation of the sleeves, and also where the sleeves slide relative to fixed abutments.

While several preferred embodiments of the invention have been shown and described, it will be apparent to those skilled in the art that changes can be made in the embodiments without departing from the principles and spirit of the invention, the scope of which is defined in the appended claims.

I claim:

1. A combination lock having a plurality of dials, each coupled to a corresponding rotary camming element having a periphery that is circular except for a peripheral portion that must be turned to a predetermined position relative to cooperable camming means to permit the lock to be opened and wherein movement of the cooperable means to close the lock is effected by mutual camming engagement between a camming element and said cooperable means, characterized in that the peripheral portion has a notch and the cooperable means has a ridge portion for each notch, the ridge portions being received in the notches, respectively, when the notches have said predetermined position.

2. A combination lock in accordance with claim 1, wherein the cooperable means comprises a pivoting bolt.

3. A combination lock in accordance with claim 1, wherein the ridge portions and the rotary elements are supported for relative sliding movement.

4. A combination lock in accordance with claim 1, wherein the cooperable means comprises a sliding bolt.

5. A combination lock in accordance with claim 1, wherein each notch is generally V-shaped and the shape of each ridge portion complements the shape of the corresponding notch.

6. A combination lock in accordance with claim 1, wherein each dial has a series of combination indicia spaced about its periphery with one indicium displayed when the peripheral portion of the corresponding rotary element has said predetermined position, and wherein the cooperable means is constantly resiliently biased toward engagement with the rotary elements and contacts the circular periphery of any rotary element substantially tangentially when that rotary element is turned to display an indicium that succeeds said one indicium at either side thereof.

7. A combination lock in accordance with claim 1, wherein the rotary elements comprise sleeves supported for rotation on a shaft and wherein each dial is supported on a corresponding sleeve for rotating that sleeve.

8. A combination lock in accordance with claim 7, wherein each sleeve has a flange constituting the circular periphery and the notches are formed in the flanges, respectively.

9. A combination lock in accordance with claim 8, wherein the cooperable means comprises a pivoting bolt, the notches are generally V-shaped, and the ridge portions have a shape that complements the shape of the notches.

10. A combination lock in accordance with claim 9, wherein the bolt is supported along an edge thereof for pivotal movement about an axis parallel to the axis of the shaft and is resiliently biased toward the sleeves, each dial having a series of indicia spaced about its periphery with one indicium displayed when the peripheral portion of the corresponding sleeve has said predetermined position, the peak of each ridge portion tangentially engaging the circular periphery of the flange of the corresponding sleeve when the corresponding dial is turned to display an indicium that succeeds said one indicium at either side thereof.

11. A combination lock in accordance with claim 1, wherein the rotary elements comprise sleeves supported for rotation on a shaft, each dial being supported on a corresponding sleeve for rotating that sleeve, each sleeve having a flange constituting the circular periphery of that sleeve, with the notches being formed in the flanges, respectively, the notches being generally V-shaped and the ridge portions having a shape that complements the shape of the notches, the sleeves and the ridge portions having relative sliding movement to open the lock.

12. A combination lock in accordance with claim 11, wherein the cooperable means comprises a sliding bolt.

13. A combination lock having a bolt and dial-driven cams for moving the bolt between an unlocked position and a locked position by camming engagement between at least one of the cams and the bolt, characterized in that each cam has a notch into which a corresponding ridge portion of the bolt fits when the bolt is in the unlocked position.

14. A combination lock in accordance with claim 13, wherein the cams turn about the same rotational axis and the bolt is supported adjacent to an edge thereof for pivotal movement about an axis parallel to the rotational axis of the cams, and wherein each cam has a periphery with its notch formed therein, the periphery being circular except for the notch.

15. A combination lock in accordance with claim 14, wherein the movement of the bolt from its unlocked position is the same when any cam is turned so as to move the corresponding ridge portion out of its notch, irrespective of the direction of rotation of the cam.

16. A combination lock in accordance with claim 15, wherein the shapes of the notches and the corresponding ridge portions are such that the bolt moves in part because of the shape of the notches and in part because of the shape of the ridge portions.

17. A combination lock in accordance with claim 15, wherein the notches are substantially V-shaped and the shape of the ridge portions complements the shape of the notches.

18. A combination lock having a plurality of dials each coupled to a corresponding rotary cam that must be turned by its respective dial to a predetermined position relative to a movable locking member in order for the locking member to assume an unlocked position, characterized in that each cam has a circular periphery formed with a notch and the locking member has a ridge portion for each notch, the locking member being positioned so that the ridge portions engage in the respective notches when the cams each have said predetermined position, the notches and ridge portions defining cooperative camming formations for moving the locking member from the unlocked position to a locked position by mutual camming engagement between a respective notch and ridge portion when any one of said cams is rotated from its predetermined position by an amount sufficient to disengage the ridge portion from the notch.

19. A combination lock having a plurality of dials each coupled to a corresponding rotary cam that must be turned by its respective dial to a predetermined position relative to a movable locking member in order for the locking member to assume an unlocked position, characterized in that each cam has a circular periphery formed with a notch and the locking member has a ridge portion for each notch, the locking member being positioned so that the ridge portions engage in the respective notches when the cams each have said predetermined position, the notches and ridge portions defining cooperative camming formations for moving the locking member by a camming action from the unlocked position to a locked position when any one of said cams is rotated from its predetermined position by an amount sufficient to disengage the ridge portion from the notch, characterized in that a point of camming contact between said formations moves along one of a pair of substantially planar converging surfaces which, when the ridge portion is in engagement with the notch, are disposed symmetrically with respect to a line passing through the center of the cam and the junction of planes defining the converging surfaces.

20. A combination lock in accordance with claim 19 characterized in that said substantially planar converging surfaces define a V-shape.

21. A combination lock in accordance with claim 20 characterized in that each notch is generally V-shaped and the shape of each ridge portion complements the shape of the corresponding notch.

22. A combination lock in accordance with claim 18 characterized in that each dial has a series of combination indicia spaced about its periphery with one indicium displayed when the corresponding rotary cam has said predetermined position, and further characterized in that the locking member is constantly resiliently biased toward engagement with the rotary cams and contacts the circular periphery of any rotary cam substantially tangentially when that rotary cam is turned to display an indicium that succeeds said one indicium at either side thereof.

23. A combination lock in accordance with claim 17 characterized in that the locking member comprises a pivoting bolt.

* * * * *